United States Patent
Kim et al.

(10) Patent No.: US 11,597,348 B2
(45) Date of Patent: Mar. 7, 2023

(54) DETECTING ABNORMAL CAN BUS WAKE-UP PATTERN

(71) Applicant: Ford Global Technologies, LLC, Dearborn, MI (US)

(72) Inventors: Yu Seung Kim, San Jose, CA (US); Byungho Cha, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 16/918,853

(22) Filed: Jul. 1, 2020

(65) Prior Publication Data
US 2022/0001835 A1   Jan. 6, 2022

(51) Int. Cl.
| | |
|---|---|
| *B60R 25/20* | (2013.01) |
| *G06F 1/3296* | (2019.01) |
| *B60R 16/023* | (2006.01) |
| *B60R 25/30* | (2013.01) |
| *H04L 12/40* | (2006.01) |
| *B60R 25/10* | (2013.01) |

(52) U.S. Cl.
CPC ...... *B60R 25/2063* (2013.01); *B60R 16/0231* (2013.01); *B60R 25/10* (2013.01); *B60R 25/30* (2013.01); *G06F 1/3296* (2013.01); *H04L 12/40* (2013.01); *H04L 2012/40215* (2013.01); *H04L 2012/40273* (2013.01)

(58) Field of Classification Search
CPC . B60R 25/2063; B60R 16/0231; B60R 25/10; B60R 25/30; G06F 1/3296; H04L 12/40; H04L 2012/40215; H04L 2012/40273
See application file for complete search history.

(56) References Cited

U.S. PATENT DOCUMENTS

| | | | |
|---|---|---|---|
| 2009/0309714 A1 | 12/2009 | Baruco et al. | |
| 2015/0172306 A1 | 6/2015 | Kim et al. | |
| 2015/0358351 A1 | 12/2015 | Otsuka et al. | |
| 2016/0009257 A1* | 1/2016 | Joyce | B60T 8/885 |
| | | | 701/70 |

(Continued)

FOREIGN PATENT DOCUMENTS

EP   2404792 A1 *   1/2012   ............ B60R 25/04

OTHER PUBLICATIONS

CN 109581122A with English Translation. (Year: 2019).*

(Continued)

*Primary Examiner* — Calvin Cheung
(74) *Attorney, Agent, or Firm* — Brandon Hicks; Kilpatrick Townsend & Stockton LLP

(57) ABSTRACT

Techniques for using a detector coupled to a controller area network (CAN) bus of a vehicle system to identify and generate alerts in response to wake-up attacks on the vehicle system. Techniques include an electronic control unit (ECU) sending a wake-up message across the CAN bus that is detected by the detector. The detector includes memory and a processor to identify the timestamp of the wake-up message when the vehicle ignition is off. The detector determines a total operational time for the ECU over an observation time period and generates a notification of a wake-up anomaly when the total operational time over the observation time period exceeds a predetermined threshold.

20 Claims, 7 Drawing Sheets

(56) References Cited

U.S. PATENT DOCUMENTS

| | | |
|---|---|---|
| 2016/0294578 A1 | 10/2016 | Maise et al. |
| 2017/0005828 A1 | 1/2017 | Gino et al. |
| 2017/0126711 A1 | 5/2017 | Jung et al. |
| 2019/0067961 A1* | 2/2019 | King .................... H02J 7/0045 |

OTHER PUBLICATIONS

CN 109353221A with English Translation. (Year: 2019).*
CN 105313719A with English Translation. (Year: 2016).*
CN 101237345A with English Translation. (Year: 2008).*
"CAN Bus Failure Management Using the P8xC592 Microcontroller" by Jens-Ulf Pehrs, retrieved from https://docs.rs-online.com/6748/0900766b8002ba87.pdf, publication date unknown; retrieval date Oct. 19, 2022 (Year: 2022).*
Currie, "Hacking the CAN Bus: Basic Manipulation of a Modern Automobile Through CAN Bus Reverse Engineering", SANS Institute, Information Security Reading Room, Jun. 20, 2017, 57 pages.
Tak, "From Attack to Defense: Toward Secure In-vehicle Networks", 2018, 189 pages.
Cho, et al. "Who Killed My Parked Car?", Jan. 23, 2018, 27 pages.

* cited by examiner

DETECTING ABNORMAL CAN BUS WAKE-UP PATTERN

BACKGROUND

Modern vehicles include an internal network including more than one hundred Electronic Control Units (ECUs) that control features and functions of the vehicle including security, diagnostics, comfort, and infotainment. The ECUs communicate with each other and other vehicle computer systems over a Controller Area Network (CAN) bus. The CAN bus handles all communications within a vehicle system and is highly impacted by desynchronized ECUs. Additionally, the CAN bus is one of the most widespread bus technologies in use and is a primary target for attacks. Wake-up attacks may cause ECUs to repeatedly wake and generate messages across the CAN bus without the vehicle system starting up, draining the battery of the vehicle system and causing the vehicle battery to be unable to start up or power the vehicle system.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle system, including a controller area network (CAN) bus, an electronic control unit (ECU) communicatively coupled to the can bus, and a detector communicatively coupled to the CAN bus. The detector includes, a non-volatile memory, a CAN transceiver, a CAN controller, and a microcontroller including a memory having stored thereon instructions that, upon execution by one or more processors of the microcontroller, cause the one or more processors to perform various operations. The operations include receiving a message from the ECU communicated across the CAN bus at a first time and storing, in the non-volatile memory, a wake-up time corresponding to the first time. The operations include determining a total operation time for the ECU over an observation time period by summing all operational time over the observation time period. The operations also include generating a wake-up anomaly notification based on a determination that a percentage of the total operation time over the observation time period exceeds a predetermined threshold.

Implementations may include one or more of the following features. Determining the total operation time for the ECU is performed in response to a determination that a difference between a present time and a sleep time of the ECU is greater than a threshold difference. The threshold difference may be less than one hundred milliseconds. The instructions include further instructions that, upon execution by the one or more processors, cause the one or more processors to store, in the non-volatile memory, a sleep time in response to a determination that a difference between a present time and a sleep time of the ECU is within a threshold difference. The instructions include further instructions to determine that an ignition of the vehicle system is not currently active due to a vehicle key. The vehicle key may include a key fob and determining that the ignition of the vehicle system is not currently active due to the vehicle key includes determining the key fob is not detected within a cab of the vehicle system. Determining that the ignition of the vehicle system is not currently active due to the vehicle key may include determining the vehicle key is not inserted into the ignition of the vehicle system. The detector may be located in a gateway of the CAN bus. The vehicle system may include a plurality of CAN busses and a plurality of detectors and where a detector is coupled to each of the plurality of CAN busses. The predetermined threshold may be a value greater than 50%. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Modern vehicles include many Electronic Control Units (ECUs) communicating with each other and with a vehicle computing system. The ECUs communicate with each other over a controller area network (CAN) bus. When a vehicle is powered off, the majority of components within the vehicle, including most ECUs, are powered off to avoid draining the battery. A few components may remain in standby mode to receive, for example, signals to remote start or remote unlock the vehicle. Some or all of these ECUs may temporarily power up in response to different signals received, and communications across the CAN bus may wake other ECUs as well. In some cases, an attacker may be able to exploit the wake-up function of the ECUs if remote access to the CAN bus is allowed to repeatedly wake up ECUs in communication with the CAN bus and drain the battery of the vehicle, potentially rendering the vehicle temporarily inoperable until the battery can be recharged or replaced.

The battery drain of a vehicle can be directly measured by checking a state of charge (SOC) of the car battery in a regular matter with a purpose-built device, however, a device for measuring the SOC may further require an energy source and may not always be possible. The systems and methods described below enable detection of a wake-up anomaly when the ignition of a vehicle is turned off. The detector and associated methods described herein may be deployed in a CAN bus, gateway, or other communication system of a vehicle to detect and flag abnormal wake-up patterns and respond to wake-up style attacks on vehicle systems.

When the detector is woken up by a message being communicated across the CAN bus, the detector checks the status of the ignition of the vehicle. When the ignition is powered off, the detector logs the wake-up time in a separate, non-volatile memory. Before transitioning into sleep mode, a CAN transceiver receives the sleep time of the woken ECU, and a microcontroller of the detector logs the sleep time to the memory. During the wake-up periods, the detector monitors the total operation time of the ECU that received the wake-up signal during an observation time period. When the total operational time over the observation time period exceeds a predetermined threshold (e.g., measured as a percentage of the total time in the observation time period), the detector determines that a wake-up attack is occurring on the vehicle which may drain (i.e., discharge) the battery.

The systems and methods described herein may be used to enhance the robustness of a vehicle system against wake-up style attacks by identifying potential attacks and flagging the activity or responding accordingly. The robustness of the vehicle system is enhanced without reduction in the quality or speed of message communication across the CAN bus.

Figure 1:
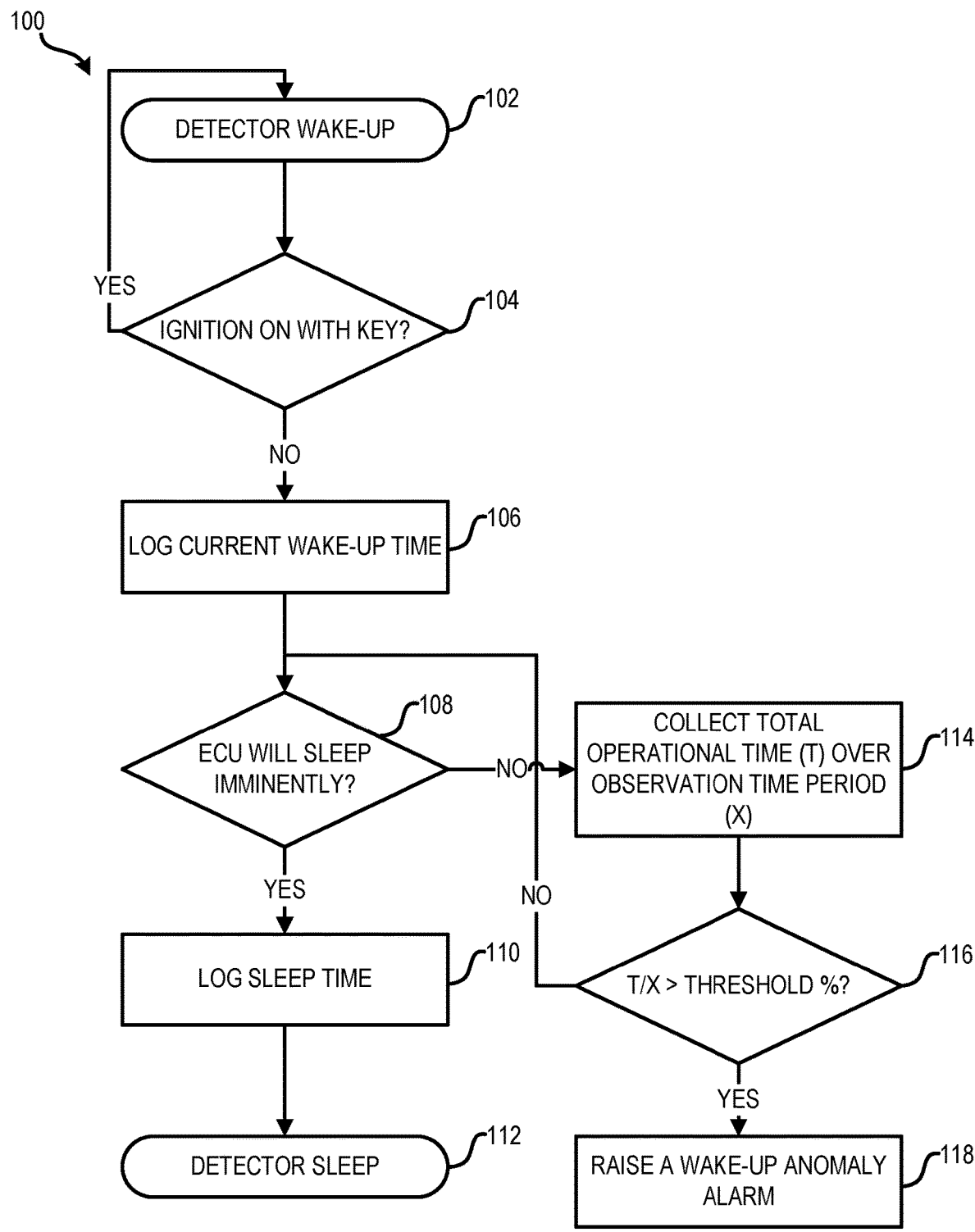
FIG. 1 illustrates a flow diagram depicting a process for detecting abnormal wake-up patterns in a CAN bus of a vehicle system, according to some embodiments.

Turning to FIG. 1, a flow diagram 100 depicting a logical flow for detecting abnormal wake-up patterns in a CAN bus of a vehicle system is depicted, according to some embodiments. The flow diagram 100 may represent a process performed by a detector (e.g., detector 308 as described with respect to FIGS. 3 and 4) of a vehicle system, for example upon receiving a message from an ECU or other element across the CAN bus of the vehicle system (e.g., CAN bus 302 or 304 described with respect to FIG. 3). The flow diagram 100 may be described in computer-readable instructions stored on a storage device and executed by one or more processors (e.g., the microcontroller 354 described with respect to FIG. 4). In some examples, the flow diagram 100 may be performed by other elements of the vehicle system, such as a vehicle computing device or ECU, according to some embodiments.

The flow diagram 100 begins at 102 with the detector receiving a wake-up signal communicated across the CAN bus. The wake-up signal may be a message conveyed from an ECU or any other signal communicated across the CAN bus. In some examples, the wake-up signal may be a particular signal that indicates initialization of a process of startup of an ECU. In some examples, the wake-up signal may only be conveyed when an ECU wakes up or initializes for the first time following a rest or shutdown of the vehicle system. The wake-up signal may include instructions for other ECUs or may simply provide a notification of a wake-up for a component coupled to the CAN bus.

At 104, the detector determines whether the ignition of the vehicle is on with a key. In some examples, the vehicle system may already be running with an ECU starting up after startup of the vehicle system, in such cases, the flow diagram 100 returns to 102 to repeat the flow diagram again as needed. In some examples, the vehicle may be started with a key in an ignition of the vehicle and in some cases the vehicle may be started or initialized based on the presence of a key fob within a cab of the vehicle. In some examples, the vehicle may be remotely started with a remote device such as a mobile device, remote start control, or other such device, the detector may determine whether the vehicle has been started using any of the above or other methods at 104. In the event the ignition is not on (i.e., the ignition is off) then the flow diagram 100 proceeds to 106. In some examples, at 104 the detector may access an existing keyless system over the CAN bus to detect the presence or use of a vehicle key.

At 106, the detector logs a wake-up time based on the wake-up signal received at 102. The detector stores the wake-up time based on a timestamp of the wake-up signal. The wake-up time is stored in a non-volatile memory of the detector (e.g., memory 356 of FIG. 4). Non-volatile memory is used in the detector so that during powered down or shut off periods the wake-up time is maintained. The wake-up time may be stored based on a main clock or timescale maintained by a computing device of the vehicle system. The main clock may be maintained or provided by one or more ECUs or the gateway. The wake-up time may be stored with an indication that it is a wake-up time, as well as an indication or data relating to which ECU or component conveyed the signal across the CAN bus.

At 108, the detector determines or receives an indication that the ECU which conveyed the wake-up signal at 102 will sleep imminently. The determination at 108 is performed by a CAN transceiver, such as CAN transceiver 350 of FIG. 4, and includes a determination of when the ECU will be powered down. The CAN transceiver conveys this information to the microcontroller for processing. In some examples, the ECU itself conveys the power-down information describing an imminent or upcoming sleep of the ECU. The ECU provides information relating to when the ECU will enter a sleep phase to the CAN transceiver. In some examples, the detector may determine when a time period between the current time and a sleep time for the ECU is less than a threshold time. The threshold time may be a period of several to several hundred milliseconds. The determination at 108 may be performed iteratively or repetitively based on whether the sleep phase is imminent.

For each iteration of 108, if the sleep phase is imminent, i.e., within a period of milliseconds, then the detector logs the sleep time at 110 based on the same timescale as the wake-up time. The detector logs the sleep time to the memory and may couple or pair the sleep time with the wake-up time to identify a total wake time between the wake-up time and the sleep time as logged by the detector.

At 112, the detector and ECU sleep based on the sleep time at 110. The ECU may power down independently or may be powered down based on a signal from the vehicle computing system or the CAN transceiver. The detector may likewise power down. In some examples, the detector may convey a signal to power down the ECU that conveyed the message at 102 and thereby shutting down communications over the CAN bus. The ECU may enter a sleep phase without any input from the detector. In some examples a telematics control unit (TCU) may receive a signal from outside the vehicle system and propagate the signal or instructions to other ECUs to prepare to sleep.

If the sleep phase of the ECU is not imminent at 108, then the flow diagram 100 proceeds to 114. At 114, the detector determines a total operational time over an observation period. The total operation time identifies wake-up and corresponding sleep times for ECUs and adds up the time between the wake-up and sleep times cumulatively for all ECUs over the observation time period. This operational time summation is illustrated with respect to FIG. 2.

At 116, the detector compares the total operational time over the observation time period to a predetermined threshold. The total operational time over the observation time period may be reflected as a number of seconds, minutes, percentage of total time, or other measurement. In some examples, the predetermined threshold may be a percentage, for example fifty percent or more of the observation time period. In such examples, when the total operational time exceeds fifty percent of the time period, the detector proceeds to 118. The observation time period may be a few second, a few minutes, or any suitable timeframe. In instances where the total operational time does not exceed the threshold, the flow diagram 100 returns to 108 to iteratively perform the function at 108.

At 118, when the total operational time over the observation time period exceeds the predetermined threshold, the detector may generate a wake-up anomaly alarm or notification. The detector may convey this alarm to a computing device of the vehicle system for the computing device to take mitigating or some other action in response. For example the computing device may convey a notification to an external computing device, such as a cloud device or a mobile device of an owner of the vehicle to notify of the anomaly. In some examples, the computing device may also respond to the alarm by shutting down or preventing wake-up of ECUs of the vehicle system until a key on signal, such as a key in the ignition or the presence of a key fob, is detected.

Figure 2:
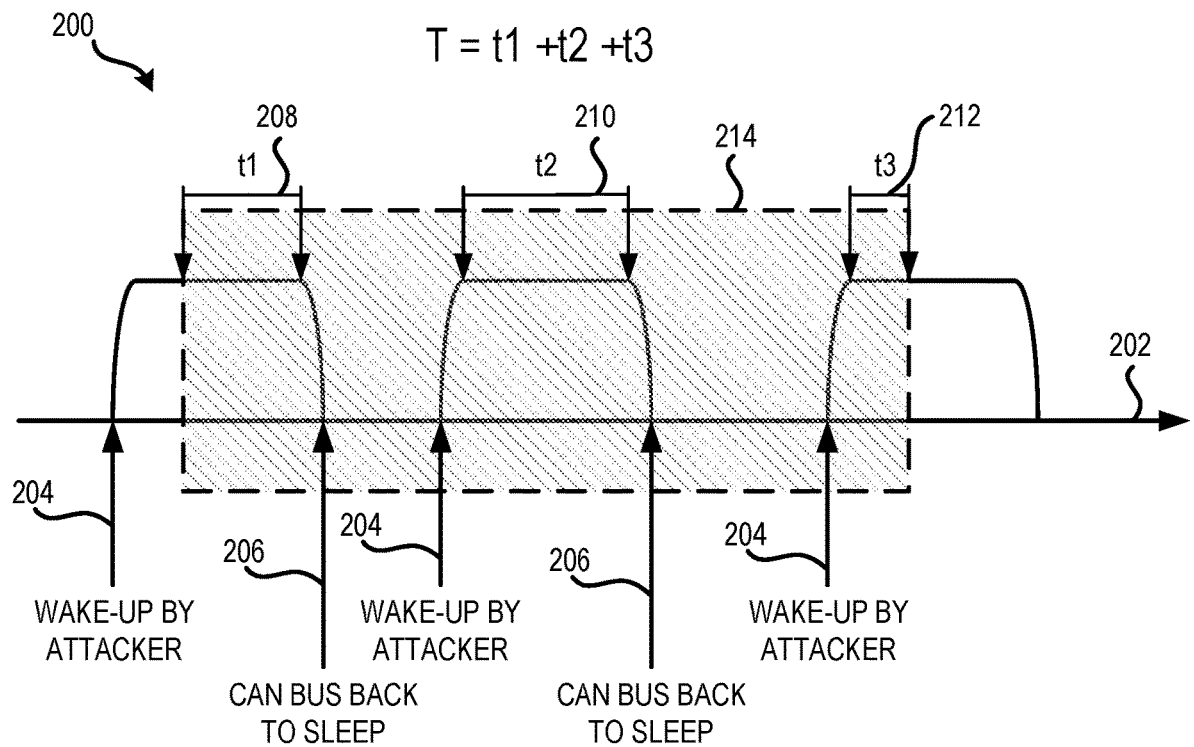
FIG. 2 illustrates a simplified timescale diagram depicting a malicious wake-up pattern, according to some embodiments.

FIG. 2 illustrates a simplified timescale diagram 200 depicting a malicious wake-up pattern, according to some embodiments. The timescale diagram 200 includes a timeline 202 providing context for the progression of time. The timescale diagram illustrates wake-up and sleep patterns for ECUs as detected by a detector communicatively coupled to the CAN bus of a vehicle, such as the detector 308 described with respect to FIGS. 3 and 4.

Along the timeline 202 are a series of wake-up events 204 as well as a series of sleep events 206. The wake-up events 204 represent the signals detected by the detector, for example at 102 of the flow diagram 100. The sleep events 206 correspond to ECUs entering a sleep phase, corresponding to sleeping events logged at 110 of the flow diagram 100.

In the example shown in FIG. 2, a detector may detect repeated wake-up and sleep signals communicated from one or more ECUs over the CAN bus. As illustrated, three different wake-sleep events are shown sequentially in the timescale diagram 200. Though shown sequentially, in some examples, the wake-sleep events, defining the operational time of the ECUs, may be overlapping, for example in instances where multiple ECUs are operational at the same time.

An observation time period 214 is shown by the shaded box, which identifies a time period over which the detector compares the operational time of the ECUs to the length of the observation time period 214 to identify wake-up anomalies. The observation time period 214 may be less than a second, several seconds, a period of one to two minutes, or up to a period of five or more minutes in some examples. The observation time period 214 terminates at a current or present time and the detector observes or checks operational data over the duration of the observation time period 214. Operational time t1 identifies first operational time 208 from the start of the observation time period to the sleep signal 206 of the active ECU. Operational time t2 identifies second operational time 210 from the wake-up event 204 to the sleep signal 206 of the ECU at a second point in time. Operational time t3 identifies third operational time 212 from the wake-up event 204 to the present time. The total operational time is found by adding the operational times t1, t2, and t3. The total operational time may then be compared against the length of the observation time period 214 to identify a percentage representing the percentage of operational time for the ECUs over the observation time period. As described above, at 116 of flow diagram 100, the percentage may be compared to a predetermined threshold to identify wake-up anomalies when the percentage of operational time exceeds a predetermined threshold.

Figure 3:
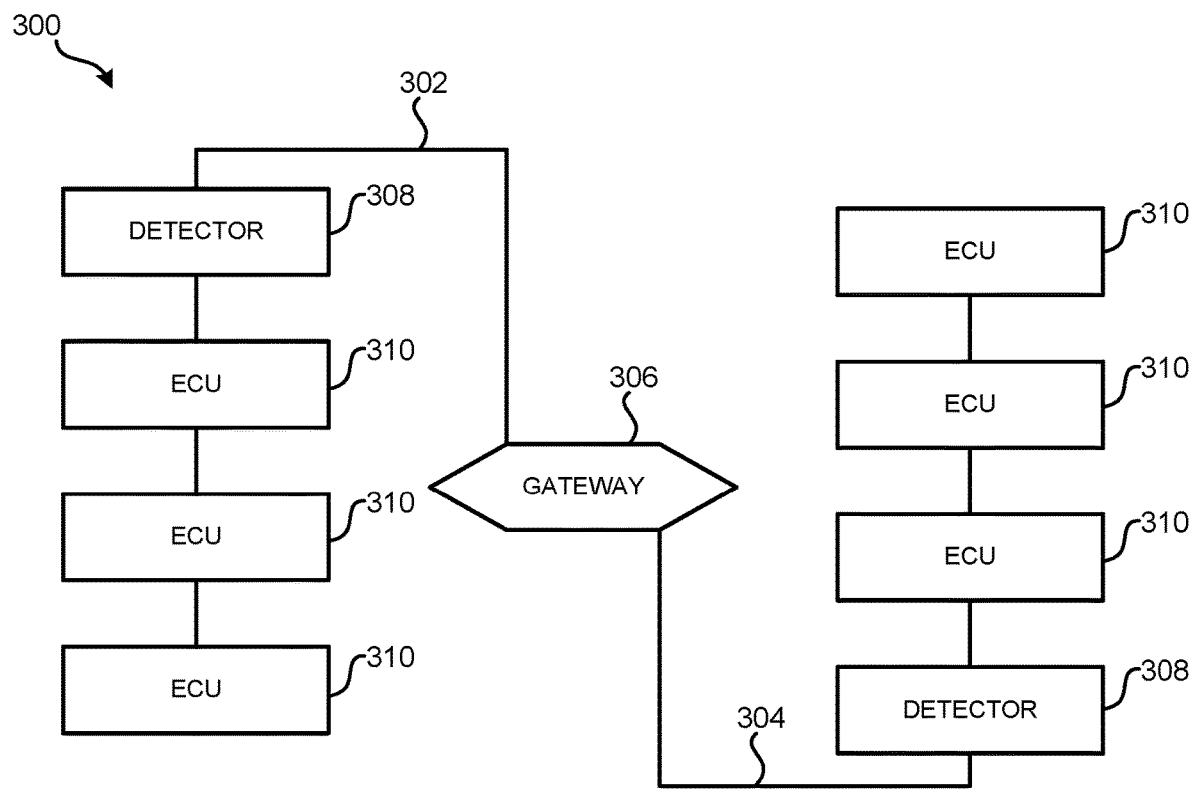
FIG. 3 illustrates a simplified diagram illustrating a deployment of detectors in a vehicle CAN bus, according to some embodiments.

FIG. 3 illustrates a simplified diagram illustrating a deployment of detectors 308 in a vehicle CAN bus system 300, according to some embodiments. In a vehicle system, such as the vehicle system 600 described with respect to FIG. 6, there may be one or more ECUs 310 communicating with each other as well as other components of the vehicle system 600 over a first CAN bus 302, a second CAN bus 304, and a gateway 306. Though the vehicle CAN bus system 300 is shown with a single gateway 306 and a first CAN bus 302 as well as a second CAN bus 304, there may be only one CAN bus, more than two CAN buses, or additional gateways in the vehicle system 600. The vehicle CAN bus system 300 provides communications between various components of the vehicle system 600. Each of the first CAN bus 302 and the second CAN bus 304 are equipped with a detector 308 to detect wake-up signals from the one or more ECUs 310 connected to the vehicle CAN bus system 300. The detectors 308 include components described with respect to FIG. 4 to perform the operations described in FIGS. 1 and 5. In some examples, the gateway 306, which provides a link between the first CAN bus 302 and the second CAN bus 304 may include a detector 308 rather than multiple detectors 308 deployed on each of the respective CAN buses. In some embodiments, the gateway 306 may include a detector 308 for each CAN bus 302, 304 that the gateway 306 is coupled to. In embodiments having multiple gateways 306, each gateway 306 may contain one or more detector 308. Furthermore, though the ECUs 310 and detectors 308 are shown connected in series, this is merely for illustrative purposes as the first CAN bus 302 and the second CAN bus 304 provide communications between all of the elements connected thereto.

Figure 4:
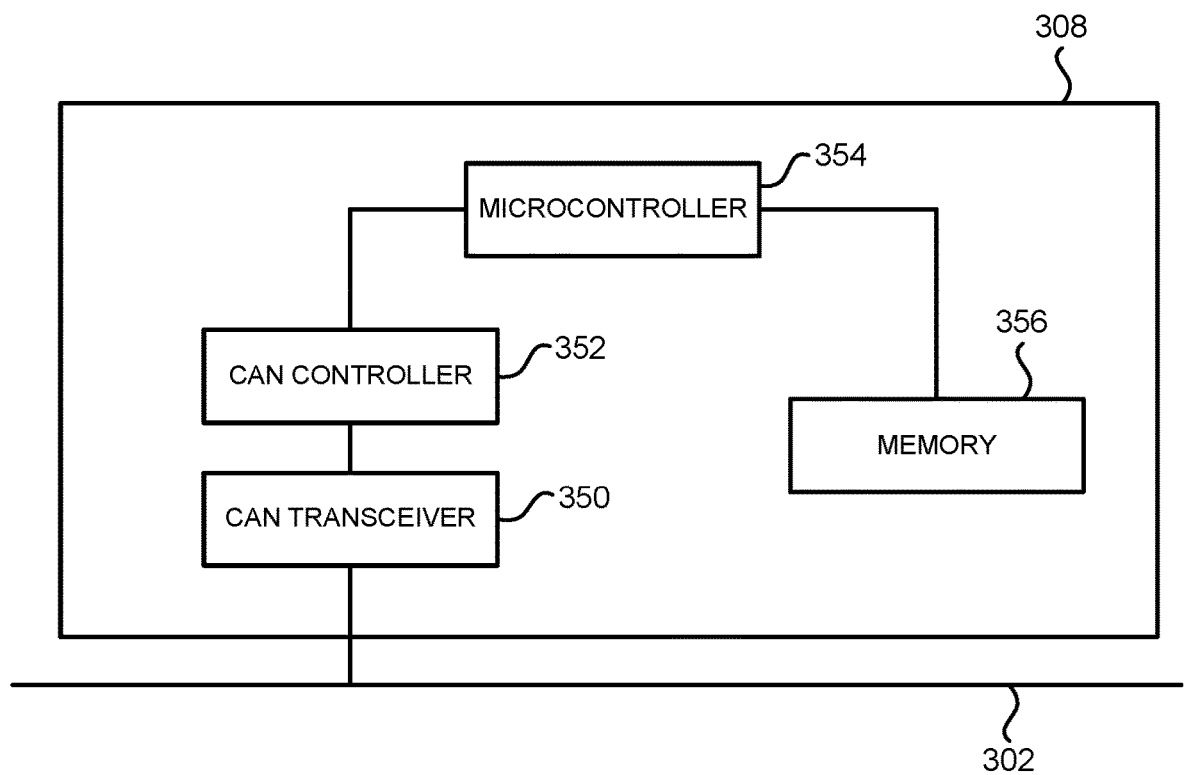
FIG. 4 illustrates a simplified diagram illustrating components of a detector, according to some embodiments.

FIG. 4 illustrates a simplified diagram illustrating components of a detector 308, according to some embodiments. The detector 308 includes a CAN transceiver 350, a CAN controller 352, a microcontroller 354, and a memory 356. The CAN transceiver 350 interfaces between the CAN controller 352 and the microcontroller 354 and the CAN bus 302. The CAN transceiver 350 receives data from the CAN bus 302 and converts the data for use by the CAN controller 352. Additionally, the CAN transceiver 350 converts data and signals from the CAN controller 352 for communication along the CAN bus 302. The CAN transceiver 350 receives the wake-up and sleep signals described with respect to FIG. 1. The microcontroller 354 may include one or more processors for processing instructions stored on the memory 356 as well as for storing data to the memory 356. The microcontroller 354 performs the flow diagram 100 as well as the method of FIG. 5 based on instructions stored in the memory 356. Memory 356 is a non-volatile memory device capable of storing instructions as well as receiving data to be stored.

Figure 5:
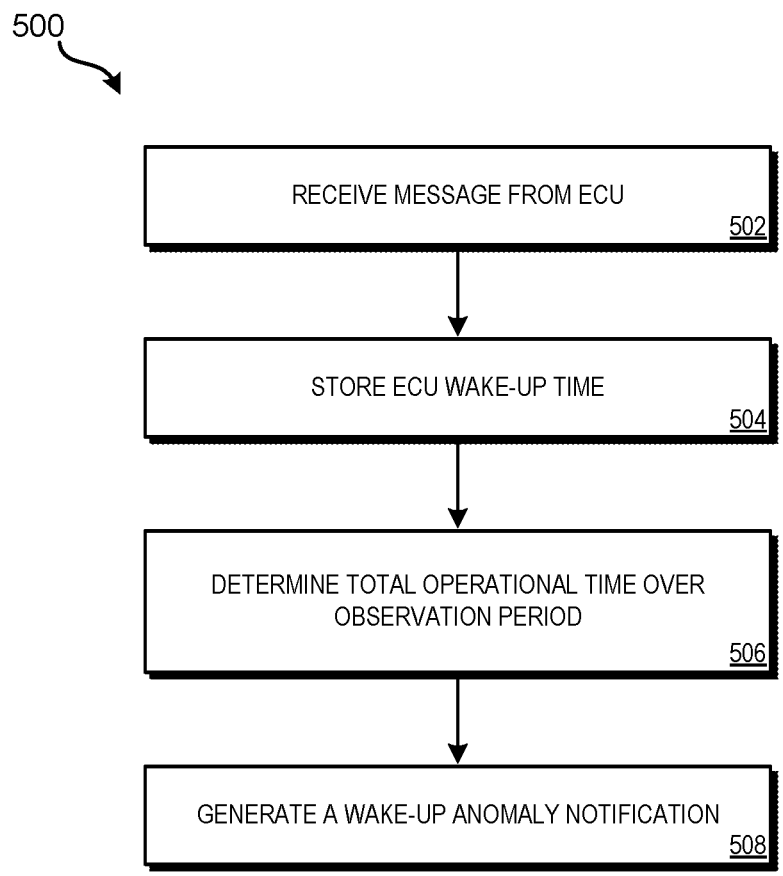
FIG. 5 illustrates a method for detecting and generating alarms for abnormal wake-up patterns, according to some embodiments.

FIG. 5 illustrates a method 500 for detecting and generating alarms for abnormal wake-up patterns, according to some embodiments. The method 500 may be performed by, for example, a detector such as detector 308 communicatively coupled with a CAN bus 302. In some examples, the method 500 maybe performed by a computing device, such as the computing system 602 of the vehicle system 600. Though the steps of method 500 are presented in sequential order, some or all of the steps may be performed in different sequences, including simultaneously, in some examples.

At step 502, a computing device, which may be a detector including a microprocessor, such as detector 308, receives a message communicated along the CAN bus of a vehicle system. The message may be communicated from an ECU or any other component communicatively coupled to the CAN bus. The message may indicate that the ECU or other component has awakened or initialized, for example from a sleep mode or powered off mode. The message may include data describing an action to be performed or may, in some examples only include an alert that the ECU is awake. The detector may also confirm that the vehicle system is not initiated or powered up by confirming that the ignition of the vehicle has not been engaged with a key of the vehicle system. In some examples this may include confirming that no key is present in the ignition of the vehicle, the ignition is turned to an off position, and that a key fob used to provide access to start a vehicle is not within or in proximity of the vehicle. In some examples the detector may instruct the computing device of the vehicle to perform the check of the ignition and receive a signal from the computing device indicating whether the ignition is off or on.

At step 504, in response to receiving the wake-up message and confirming that the ignition is turned off, the detector stores the time of the wake-up message received at step 502 in a memory of the detector, such as memory 356. The time of the wake-up message may be stored with an indication that the time is associated with a wake-up event, and in some cases may also include information relating to which component or ECU conveyed the wake-up message.

At step 506, the detector determines a total operational time for ECUs connected to the CAN bus over an observation time period. In some examples this determination may be in response to a determination by the detector or the CAN transceiver, that the ECU that conveyed the wake-up signal will not enter a sleep phase in the imminent future. For example, the detector may determine that the sleep time of the ECU is greater than a threshold period of time away from the current time. In some examples, the threshold period of time may be around one hundred milliseconds. In some examples the threshold may be less than one hundred milliseconds and may be as small as only two milliseconds. In some examples the threshold may be up to or greater than one second. In the event the ECU will sleep or the sleep time is within the threshold of the current time then the detector may store the sleep time in the memory for use in calculating total operational time. Following this storing, the ECU and the detector may both enter a sleep mode.

The total operational time for the ECUs may be determined by adding up the operational time between a wake-up time and a sleep time for each of the ECUs activated during the observation time period, as described with respect to FIG. 2.

At step 508, the method 500 includes generating a wake-up anomaly notification based on the total operational time determined at step 506. The total operational time may be compared against the length of the observation time period to generate a percentage, for example, what percentage of the observation time period was covered by the total operational time. In instances where a wake-up attack is being perpetrated, the total operational time will be a large percentage of the observation time period. In some examples, the observation time period may be a period of less than one second, around one second, greater than one second, several seconds, a period of one to two minutes, or a period of up to five minutes.

In some examples, the total operational time, expressed as a percentage of the observation time period, may be compared against a threshold percentage. For example, when the total operational time is greater than fifty percent of the observation time period, the detector may generate a wake-up anomaly notification based on the total operational time exceeding the threshold percentage. In some examples, the wake-up anomaly notification may be generated in response to a determination by the detector that the total operational time exceeds a particular value rather than a percentage. In some examples, the detector may further analyze the pattern of wake-up and sleep times to identify repetitive wake-up events that are triggered without the presence of a key or the ignition of the vehicle being switched on. The detector may determine that the repetitive wake-up events over the observation time period indicate a potential attack and generate a wake-up anomaly notification.

In response to generating the wake-up notification, the detector may convey the notification to the computing device. The computing device may provide the notification to a remote computing device, such as a mobile device or server computer for notifying a user of the anomaly. The computing device may also display the notification on a display of the vehicle system, such as display 628 of FIG. 6. The computing device or the detector may, in some examples prevent receipt of incoming external messages over the CAN bus to cease the wake-up attack. In some cases, the computing device or detector may instruct or otherwise cause the ECUs to remain in a sleep or powered off mode until the key of the vehicle system is present or any other preventative action to cease the repetitive wake-up pattern.

Figure 6:
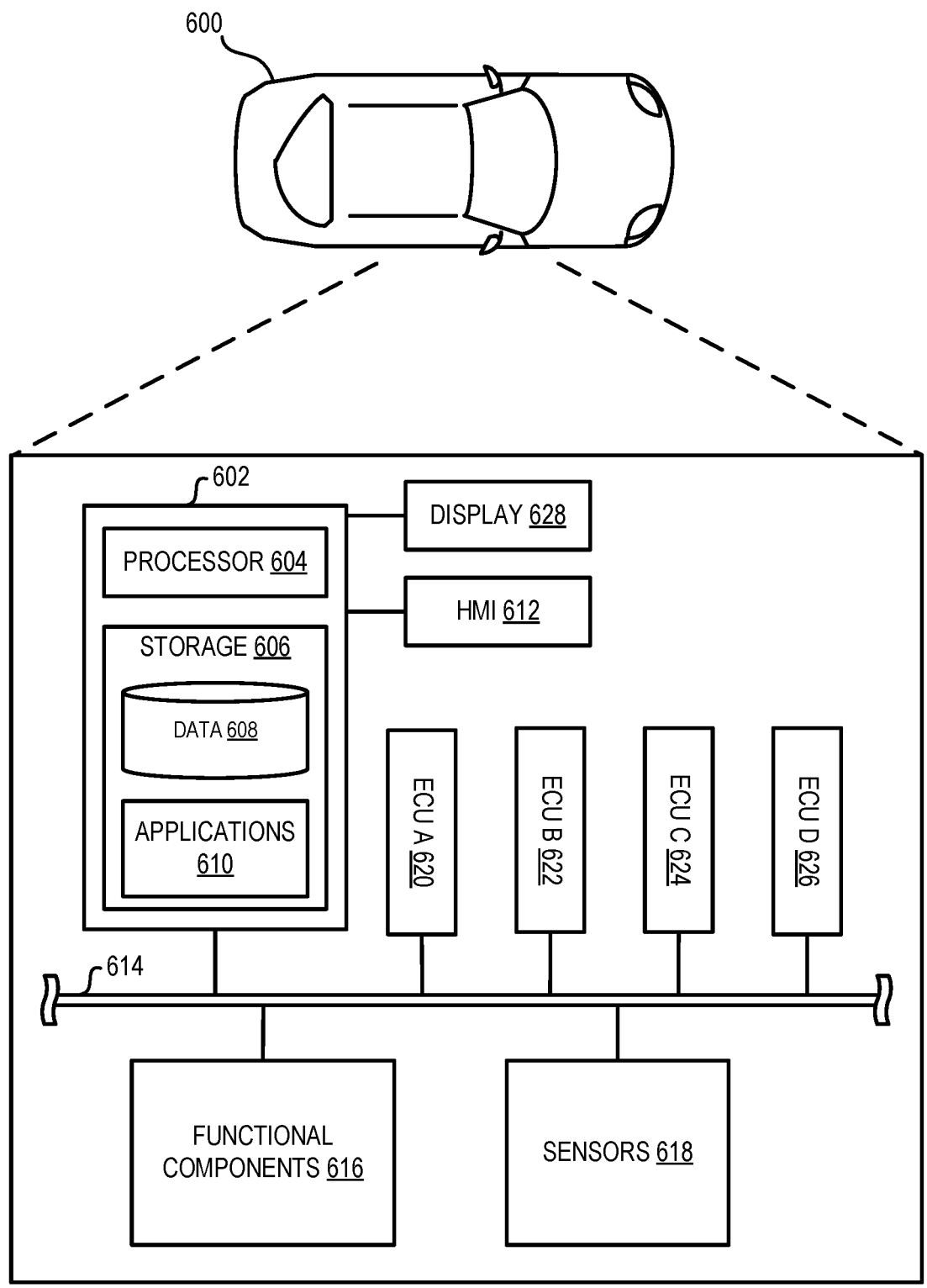
FIG. 6 illustrates a block diagram of a vehicle system, according to some embodiments.
Figure 7:
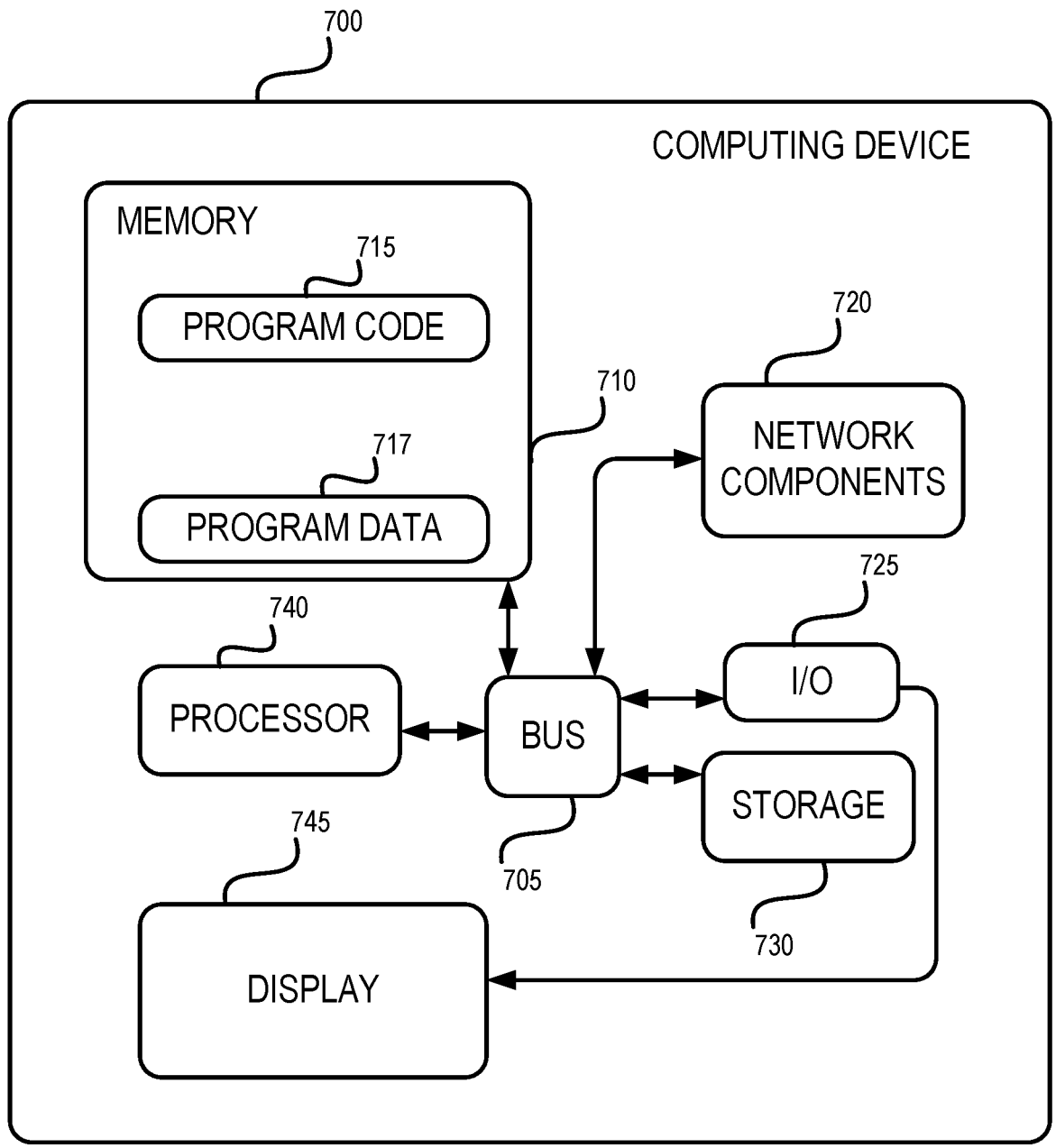
FIG. 7 illustrates a block diagram of a computing system, according to some embodiments.

Any suitable computing system or group of computing systems can be used for performing the operations or methods described herein. For example, FIG. 6 illustrates a vehicle system including a computing system 602 as well as multiple ECUs which may perform some or all of the functions described herein. FIG. 7 further depicts an example of a computing device 700 that may be at least a portion of computing system 602.

FIG. 6 illustrates a block diagram of a vehicle system 600, according to some embodiments. The vehicle system 600 may include a computing system 602 configured to communicate over an in-vehicle network 614. The computing system 602 includes a processor 604 and storage 606. While a vehicle system 600 is shown in FIG. 6, the example components as illustrated are not intended to be limiting. Indeed, the vehicle system 600 may have more or fewer components, and additional or alternative components and/or implementations may be used. It should be noted that the use of a vehicle system 600 environment is illustrative, as the components and functionality may be utilized in other types of systems such as flight control system in an airplane, or a medical device or industrial machine.

The vehicle system 600 may include various types of automobile, crossover utility vehicle (CUV), sport utility vehicle (SUV), truck, recreational vehicle (RV), boat, plane or other mobile machine for transporting people or goods. In many cases, the vehicle system 600 may be powered by an internal combustion engine. As another possibility, the vehicle system 600 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 600 may vary, the capabilities of the vehicle system may correspondingly vary. As some other possibilities, vehicle system 600 may have different capabilities with respect to passenger capacity, towing ability and capacity, and storage volume.

The computing system 602 may include a Human Machine Interface (HMI) 612 and a display 628 for user interaction with the computing system 602. An example computing system 602 may be the SYNC™ system provided by FORD MOTOR COMPANY™ of Dearborn, Mich. In some examples the display 628 may include a vehicle infotainment system including one or more displays. The HMI 612 may be configured to support voice command and BLUETOOTH™ interfaces with the driver and driver carry-on devices, receive user input via various buttons or other controls, and provide vehicle status information to a driver or other vehicle system 600 occupants. For instance, the computing system 602 may interface with one or more buttons or other HMI 612 configured to invoke functions on the computing system 602 (e.g., steering wheel audio buttons, a push-to-talk button, instrument panel controls, etc.). The computing system 602 may also drive or otherwise communicate with the display 628 configured to provide visual output to vehicle occupants, e.g., by way of a video controller. In some cases, the display 628 may be a touch screen further configured to receive user touch input via the video controller, while in other cases the display 628 may be a display only, without touch input capabilities. In an example, the display 628 may be a head unit display included in a center console area of the vehicle system 600. In another example, the display 628 may be a screen of a gauge cluster of the vehicle system 600.

The computing system 602 may further include various types of computing apparatus in support of performance of the functions of the computing system 602 described herein. In an example, the computing system 602 may include one or more processors 604 configured to execute computer instructions, and a storage 606 medium on which computer-executable instructions and/or data may be maintained. A computer-readable medium (also referred to as a processor-readable medium or storage 606) includes any non-transitory (e.g., tangible) medium that participates in providing data (e.g., instructions) that may be read by a computer (e.g., by the one or more processors 604). In general, the processor 604 receives instructions and/or data, e.g., from the storage 606, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc. The storage 606 may include divisions for data 608 and applications 610. The data 608 may store information such as databases and other such information. The applications 610 may store the computer-executable instructions or other such instructions executable by the processor 604.

The computing system 602 may be configured to communicate with mobile devices of the vehicle system 600 occupants. The mobile devices may be any of various types of portable computing device, such as cellular phones, tablet computers, smart watches, laptop computers, portable music players, or other devices capable of communication with the computing system 602. As with the computing system 602, the mobile device may include one or more processors configured to execute computer instructions, and a storage medium on which the computer-executable instructions and/or data may be maintained. In some examples, the computing system 602 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 602 may communicate with the mobile device over a wired connection, such as via a USB connection between the mobile device and a Universal Serial Bus (USB) subsystem of the computing system 602.

The computing system 602 may be further configured to communicate with other components of the vehicle system 600 via one or more in-vehicle networks 614. The in-vehicle networks 614 may include one or more of a vehicle controller area network (CAN), an Ethernet network, or a media oriented system transfer (MOST), as some examples. The in-vehicle networks 614 may allow the computing system 602 to communicate with other units of the vehicle system 600, such as ECU A 620, ECU B 622, ECU C 624, and ECU D 626. The ECUs 620, 622, 624, and 626 may include various electrical or electromechanical systems of the vehicle system 600 or control various subsystems of the vehicle system 600. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 600); a radio transceiver module configured to communicate with key fobs or other vehicle system 600 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 600 location and heading information, and various other vehicle ECUs configured to corporate with the computing system 602. The subsystems controlled by the various ECUs may include functional components 616 of the vehicle system 600 including elements such as the powertrain, engine, brakes, lights, steering components, and the like. Additionally, some or all of the functional components 616 may include sensors 618 as well as additional sensors equipped to the vehicle system 600 for detecting various states, positions, proximity, temperature, and the like of the vehicle system 600 and subsystems thereof. The ECUs 620, 622, 624, 626 may communicate with the computing system 602 as well as the functional components 616 and the sensors 618 over the in-vehicle network 614. While only four ECUs are depicted in FIG. 6, any number (more or fewer) of ECUs may be included in vehicle system 600.

FIG. 7 illustrates a block diagram of an example of a computing device 700. Computing device 700 can be any of the described computers herein including, for example, computing system 602 within the vehicle system 600 of FIG. 6 as well as ECUs 620, 622, 624, 626. The computing device 700 can be or include, for example, an integrated computer, a laptop computer, desktop computer, tablet, server, or other electronic device.

The computing device 700 can include a processor 740 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 700. Memory 710 can store the program code 715, program data 717, or both. In some examples, the computing device 700 can include input/output ("I/O") interface components 725 (e.g., for interfacing with a display 745, keyboard, mouse, and the like) and additional storage 730.

The computing device 700 executes program code 715 that configures the processor 740 to perform one or more of the operations described herein. Examples of the program code 715 include, in various embodiments logic flowchart described with respect to FIG. 1 above. The program code 715 may be resident in the memory 710 or any suitable computer-readable medium and may be executed by the processor 740 or any other suitable processor.

The computing device 700 may generate or receive program data 717 by virtue of executing the program code 715. For example, sensor data, trip counter, authenticated messages, trip flags, and other data described herein are all examples of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a computing device 700 with a processor 740, the system can include any number of computing devices 700 and any number of processor 740. For example, multiple computing devices 700 or multiple processor 740 can be distributed over a wired or wireless network (e.g., a Wide Area Network, Local Area Network, or the Internet). The multiple computing devices 700 or multiple processor 740 can perform any of the steps of the present disclosure individually or in coordination with one another.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A vehicle system, comprising:
   a controller area network (CAN) bus;
   an electronic control unit (ECU) communicatively coupled to the CAN bus; and
   a detector communicatively coupled to the CAN bus, the detector comprising:
      a non-volatile memory;
      a CAN transceiver;
      a CAN controller; and
      a microcontroller comprising a memory having stored thereon instructions that, upon execution by one or more processors of the microcontroller, cause the one or more processors to:
         receive a message from the ECU communicated across the CAN bus at a first time;
         store, in the non-volatile memory, a wake-up time corresponding to the first time;
         determine a total operation time for the ECU over an observation time period by summing all operational time over the observation time period; and generate a wake-up anomaly notification based on a determination that a percentage of the total operation time over the observation time period exceeds a predetermined threshold.

2. The vehicle system of claim 1, wherein determining the total operation time for the ECU is performed in response to a determination that a difference between a present time and a sleep time of the ECU is greater than a threshold difference.

3. The vehicle system of claim 2, wherein the threshold difference is less than one hundred milliseconds.

4. The vehicle system of claim 2, wherein the instructions comprise further instructions that, upon execution by the one or more processors, cause the one or more processors to:
store, in the non-volatile memory, a sleep time in response to a determination that a difference between a present time and a sleep time of the ECU is within a threshold difference.

5. The vehicle system of claim 1, wherein the instructions comprise further instructions that, upon execution by the one or more processors, cause the one or more processors to:
determine that an ignition of the vehicle system is not currently active due to a vehicle key.

6. The vehicle system of claim 5, wherein the vehicle key comprises a key fob and wherein determining that the ignition of the vehicle system is not currently active due to the vehicle key comprises determining the key fob is not detected within a cab of the vehicle system.

7. The vehicle system of claim 5, wherein determining that the ignition of the vehicle system is not currently active due to the vehicle key comprises determining the vehicle key is not inserted into the ignition of the vehicle system.

8. The vehicle system of claim 1, wherein the detector is located in a gateway of the CAN bus.

9. The vehicle system of claim 1, wherein the vehicle system comprises a plurality of CAN busses and a plurality of detectors and wherein a detector is coupled to each of the plurality of CAN busses.

10. The vehicle system of claim 1, wherein the predetermined threshold is a value greater than 50%.

11. A computer-implemented method, comprising:
receiving, at a detector communicatively coupled to a controller area network (CAN) bus, a message from an electronic control unit (ECU) of a vehicle system communicated across the CAN bus of the vehicle system at a first time;
storing, in a non-volatile memory of the detector, a wake-up time corresponding to the first time;
determining a total operation time for the ECU over an observation time period by summing all operational time over the observation time period; and
generating a wake-up anomaly notification based on a determination that a percentage of the total operation time over the observation time period exceeds a predetermined threshold.

12. The computer-implemented method of claim 11, wherein determining the total operation time for the ECU is performed in response to a determination that a difference between a present time and a sleep time of the ECU is greater than a threshold difference.

13. The computer-implemented method of claim 12, wherein the threshold difference is less than one hundred milliseconds.

14. The computer-implemented method of claim 12, further comprising storing, in the non-volatile memory, a sleep time in response to a determination that a difference between a present time and a sleep time of the ECU is within a threshold difference.

15. The computer-implemented method of claim 11, further comprising determining that an ignition of the vehicle system is not currently active due to a vehicle key.

16. The computer-implemented method of claim 15, wherein the vehicle key comprises a key fob and wherein determining that the ignition of the vehicle system is not currently active due to the vehicle key comprises determining the key fob is not detected within a cab of the vehicle system.

17. The computer-implemented method of claim 15, wherein determining that the ignition of the vehicle system is not currently active due to the vehicle key comprises determining the vehicle key is not inserted into the ignition of the vehicle system.

18. The computer-implemented method of claim 11, wherein the detector is located in a gateway of the CAN bus.

19. The computer-implemented method of claim 11, wherein the vehicle system comprises a plurality of CAN busses and a plurality of detectors and wherein a detector is coupled to each of the plurality of CAN busses.

20. The computer-implemented method of claim 11, wherein the predetermined threshold is a value greater than 50%.

* * * * *